UNITED STATES PATENT OFFICE.

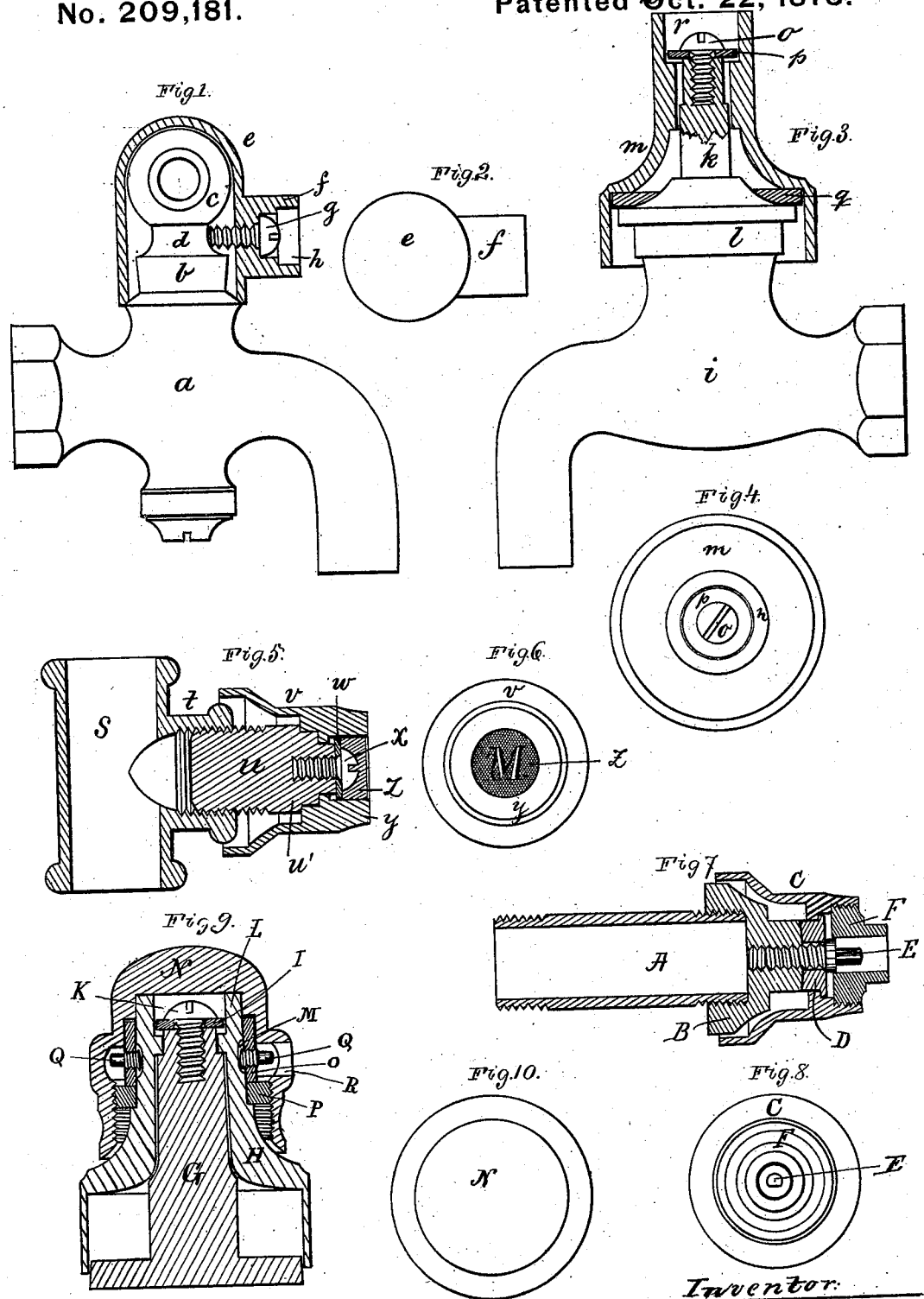

JOHN MILLER, OF CAMBRIDGEPORT, MASSACHUSETTS.

IMPROVEMENT IN LOCKING DEVICES FOR GAS AND WATER PIPES, COCKS, &c.

Specification forming part of Letters Patent No. 209,181, dated October 22, 1878; application filed February 19, 1878.

*To all whom it may concern:*

Be it known that I, JOHN MILLER, of Cambridgeport, in the county of Middlesex and State of Massachusetts, have invented certain new and useful Improvements in Locking Device for Gas and Water Pipes, Cocks, Fittings, &c.; and I do hereby declare that the following is a full, clear, and exact description thereof, which will enable others skilled in the art to which it appertains to make and use the same, reference being had to the accompanying drawing, and to letters of reference marked thereon, which form a part of this specification.

My invention relates to improvements in locking devices for the purpose of locking or locking and sealing gas and water pipes, cocks, and other fittings, so as to prevent unauthorized persons from getting access to such sealed or locked pipes, cocks, or fittings without the consent of the proprietor of the dwelling in which such cocks, fittings, &c., are located, or without the consent of the gas or water works proprietors. Heretofore padlocks have been used for this purpose; but my present invention is more simple and effective, and can be quickly applied with great ease to either cocks or faucets, T's or ends of pipes, or other fittings, so as to effectually prevent any one using gas or water from any such cocks, faucets, or fittings without the consent of the authorities in charge thereof.

My invention consists of a rotary cap or hood adapted to fit loosely around the head of the plug of a cock or faucet, or over a screw-plug inserted in the end or branch of a T-pipe, or over a screw-plug screwed over the end of an ordinary pipe, which rotary cap is provided with one or more set-screws passing through a screw-threaded side or top projection provided with (or without) a sealing ledge or recess capable of receiving a plastic or other seal covering the head of such set-screw, the inner end of which projects into any suitable annular groove on the head of the faucet, &c., without binding or pressing against such head of the faucet, &c. In this case the said set-screw is screwed through the side of the rotary hood or cap. Where the cock or faucet is of such a construction that it has a set-screw passing through the handle and screwed into a recess in the upper end of the shank of the plug, I prefer to have the sealing ledge or recess located in the upper end of the movable hood or case, and thus I am enabled to use the old screw by which the handle is secured for the purpose of attaching the aforesaid hood or cover after the handle of the plug is removed. The set-screw that I use for the purpose of holding the hood or cover in its proper position, so as to prevent access to the cock, T, pipe, or fitting, is provided with an ordinary notched head in case a plastic or other seal is used to cover it; or I make it of any desired irregular, polygonal, or peculiar shape, so that it can only be operated by means of a key of a corresponding shape in the possession of the person or persons in authority. When such screw and key are used I may dispense with the additional seal, although I may in some cases add the seal for further security, if so desired. Between the head of the set-screw and the bottom of the sealing ledge or recess I locate a washer or suitable swivel, particularly when the axis of such set-screw and the hood or cover coincide, so as to allow the said hood or cover to rotate freely without friction.

Should still further security be required in locking and sealing cocks, fittings, &c., I propose to add one or more movable caps or hoods outside of the one heretofore described, and provided with one or more set-screws and sealing ledges or recesses, as will be more fully shown and described.

On the accompanying drawing, Figure 1 represents a side elevation of an ordinary cock or faucet with its handle removed, and a sectional view of my improved locking device. Fig. 2 represents a plan view of said locking apparatus. Fig. 3 represents a side view of an ordinary compression or self-closing faucet, and a sectional view of the locking device thereon. Fig. 4 represents a plan view of the hood or cap shown in Fig. 3. Fig. 5 represents a longitudinal section of a T-pipe, with its locking device thereon; and Fig. 6 represents an end view thereof. Fig. 7 represents a sectional view of an ordinary pipe, with its external plug and locking device; and Fig. 8 represents an end view of such locking device. Fig. 9 represents a sectional view of a double locking apparatus applied to the stem of a cock or faucet, &c.; and Fig. 10 represents a top view of the same.

In Figs. 1 and 2, $a$ is the faucet, with its plug $b$, having head $c$ and annular recess or groove $d$, in the usual manner. $e$ is the movable hood or cover, fitting loosely over the head and upper portion of the plug $b$, as shown. $f$ is the side projection or sealing-ledge, through which the set-screw $g$ is screwed, its inner end projecting into the annular groove $d$ without binding against the plug, so that the hood or cover $e$ may be allowed to turn freely around its axis when the set-screw $g$ is in the position shown in Fig. 1 without being able to turn the plug or to remove the said cover until the set-screw $g$ is turned backward far enough to allow its inner end to pass by the greatest diameter of the head of the plug. $h$ represents the plastic or other seal placed in the interior of the sealing-ledge $f$, so as to cover the head of the set-screw $g$.

In Figs. 3 and 4, $i$ represents an ordinary compression or self-closing faucet, with its screw-threaded stem $k$ and cover $l$, as usual. $m$ represents the movable hood or cover, its lower end projecting below the faucet-cover $l$, and provided in its upper end with the sealing ledge or recess $n$, as shown. $o$ is the set-screw, projecting through the washer or swivel $p$, and screwed into the upper screw-threaded part of the stem $k$, as shown. $q$ is a washer, placed on the faucet-cover $l$, so as to keep the movable hood or case $m$ in its proper position; but said washer is not material, and may be dispensed with. $r$ represents the plastic or other seal in the interior of the sealing-ledge $n$, covering the head of the set-screw $o$, for the purpose set forth.

In Figs. 5 and 6, $s$ is a T-pipe, with its branch $t$. $u$ is an ordinary internal screw-plug, screwed into the branch $t$, and for convenience' sake said plug is provided with a polygonal head, $u^1$. $v$ is the movable hood or cover, projecting downward toward the branch $t$ enough so as to cover a portion thereof, as shown, or more or less, as may be desired. $w$ is the washer or swivel. $x$ is the set-screw, screwed into the screw-threaded end of the plug $u$, as shown. $y$ is the sealing-ledge, with its plastic or other seal $z$, in the same manner and for the same purpose as heretofore has been set forth.

In Figs. 7 and 8, A is an ordinary piece of pipe, having an exterior screw-thread in its outer end, over which I fit a screw-plug, B, provided with an interior screw-thread, as shown in Fig. 7. C is the movable hood or cover, with its swivel or washer D, set-screw E, sealing-ledge F; and a seal may also be added, but is not shown in the said figures, as I have represented the head of the set-screw E as being of a peculiar shape, as shown in Fig. 8, which necessitates the use of a corresponding key to turn the said set-screw, and therefore I may dispense with such seals wherever the head of the set-screw is not of the ordinary slotted form. It is optional whether a seal may or may not be used in this latter case.

In Figs. 9 and 10 is represented a double locking device, and in said figures G represents the stem of any ordinary valve-plug. H represents my improved movable hood or cover, with its swivel I, set-screw K, and sealing-ledge L, in a manner as hereinbefore described. M is an annular groove on the outside of the movable cover or hood H. N represents an additional hood or cover, surrounding the first cover, H, which additional hood is provided with an internal loose-fitting swivel-ring, O, that is kept in its proper position by means of the ring or collar P, that is screwed into the lower screw-threaded part of the additional hood N. Q Q represent set-screws, that are screwed through the loose ring or swivel O, their inner ends projecting into the annular groove M on the hood H, as shown in Fig. 9. R represents an opening through the side of the cover N, through which hole the set-screws Q Q are operated, for the purpose of connecting or disconnecting the hood N from the hood or case H.

What I wish to secure by Letters Patent, and claim, is—

The herein-described locking device, consisting of the movable hood or cap $e$ and set-screw $g$, with or without the seal, and its sealing-ledge, as and for the purpose set forth.

In testimony that I claim the foregoing as my own invention I have affixed my signature in presence of two witnesses.

JOHN MILLER.

Witnesses:
ALBAN ANDRÉN,
HENRY CHADBOURN.